March 4, 1947.   M. KATCHER ET AL   2,416,833
BICYCLE GENERATOR
Filed Dec. 1, 1944   2 Sheets-Sheet 1

INVENTORS
MORRIS KATCHER
NAT C. GREENE
BY
Emanuel Scheyer
ATTORNEY

March 4, 1947.   M. KATCHER ET AL   2,416,833
BICYCLE GENERATOR
Filed Dec. 1, 1944   2 Sheets-Sheet 2
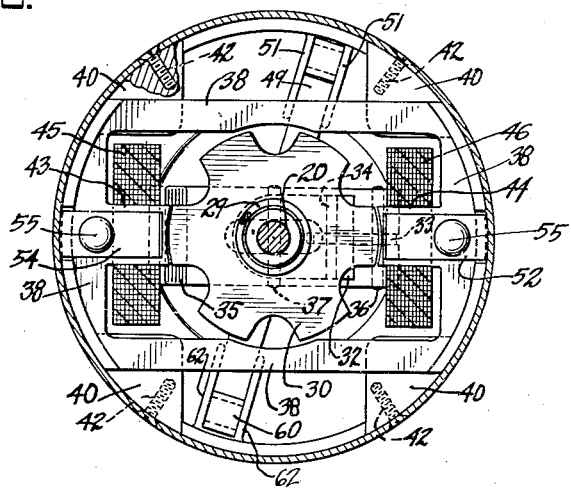
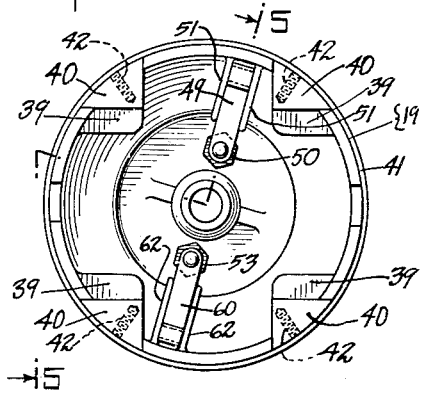
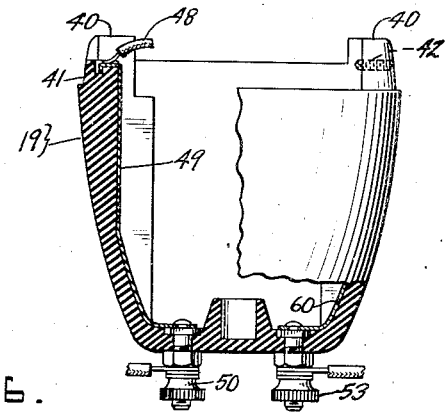
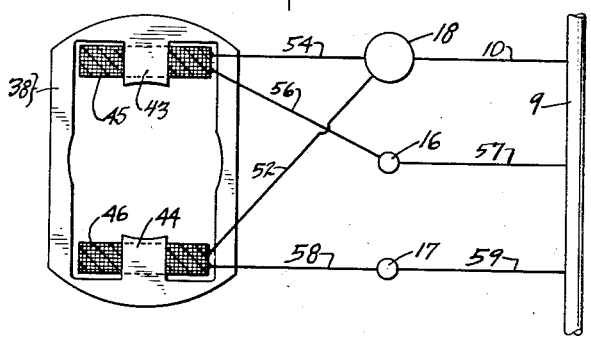
INVENTORS
MORRIS KATCHER.
NAT C. GREENE
BY
Emanuel Scheyer
ATTORNEY Patented Mar. 4, 1947

2,416,833

UNITED STATES PATENT OFFICE 2,416,833

BICYCLE GENERATOR

Morris Katcher, New York, N. Y., and Nat C. Greene, Fairfield, Ill., assignors, by mesne assignments, to Harris Trust and Savings Bank, Chicago, Ill., a corporation of Illinois, as trustee Application December 1, 1944, Serial No. 566,153

3 Claims. (Cl. 171—209)

This invention relates to a bicycle generator. Such a device is attached to the frame of a bicycle, usually the front fork, and has a friction roller engaging a tire. The rotation of the bicycle wheel, through the medium of the friction roller, rotates the permanent magnet armature of the generator, creating the necessary current to provide a current or currents to operate lights or other signaling devices. In the present embodiment, two independent lighting or signal currents are generated, one each in the circuit of two field coils for lighting a front lamp and a rear lamp on the bicycle. Current regulation is effected by a governor device which shifts the armature with respect to the field coils in accordance with the speed of the bicycle. While such regulation is old in the art, the construction shown in the present invention for effecting it is novel, simple and economical. The housing for enclosing the generator is of special construction. The upper part of the housing is a metal shell open at one end while the lower part is formed or cast of synthetic or plastic material, in the form of a casing open at one end. The two parts are attached end on at their open ends with the metal shell telescoping over the plastic casing. Inside the casing, projections formed with the casing are provided for supporting the laminated field frame and for connecting the casing to the shell, and retaining means are provided for the conductors leading from the field coils to binding posts embedded in the casing and projecting from its outside.

Other objects and advantages will become apparent upon further study of the description and drawings, in which:

Fig. 3 is a sectional plan taken along the line 3—3 of Fig. 2 with the wire connection between the field coils and the strip to the binding posts omitted.

Fig. 4 is a plan view of the lower housing part or casing shown with the shell or upper housing part removed.

Fig. 5 is a section and partial elevation taken along the line 5—5 of Fig. 4, and Fig. 6 is an electrical diagram of the wiring between the generator and the lights fed by it.

Figure 1:
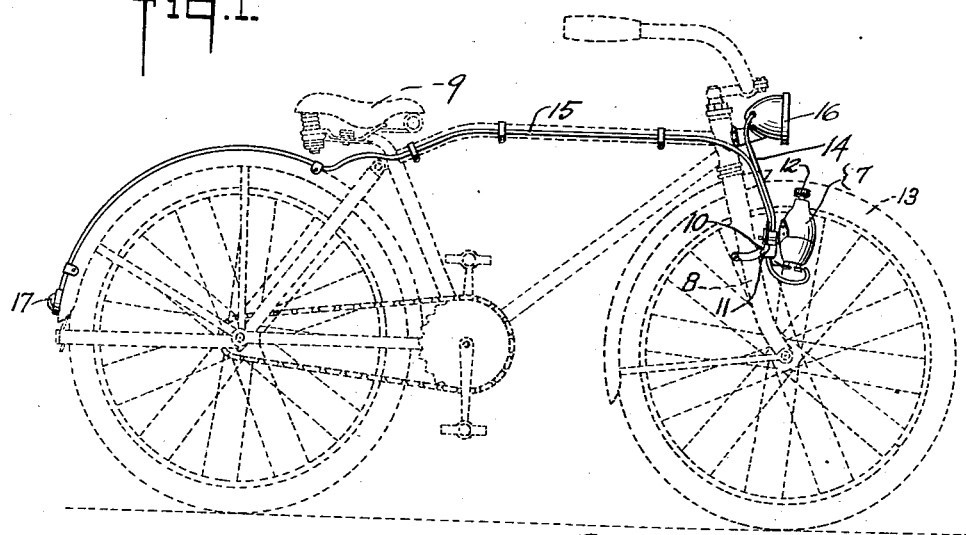
Fig. 1 is an elevation of the generator and the lights fed by it shown mounted on a bicycle.

The generator 7 is attached to one of the prongs 8 of the front fork of a bicycle 9. It is attached by means of a clamping bracket 10, which bracket serves as a journal for a pivotal shaft 11 about which the generator can be swung to bring its friction roller 12 into and out of contact with tire 13 at the will of the rider. A bracket of this nature is described in an application filed by Morris Katcher, Serial No. 523,850, and in Patent No. 2,088,029 to C. McDermott. A flexible conduit 14 leads from the generator to front lamp 16 and flexible conduit 15 leads from the generator to the rear or tail light 17.

The housing of the generator consists of an upper sheet metal shell 18 and a lower insulative, preferably plastic, casing 19. A rotatably mounted shaft 20 extends axially of the housing. The upper part of shaft 20 is journaled in an anti-friction bushing 21 while its lower end bears against ball 22 set in a depression at the top of pedestal 23. A hollow lug 30 projecting upward from the bottom of casing 19 provides a pocket in which is set pedestal 23. Oilless bushing 61 surrounds the lower end of shaft 20 and the upper end of pedestal 23. Friction roller 12 is fixedly mounted on the upper end of shaft 20 being held there by nut 25. A pin 26 is set fixedly in a hole in shaft 20. Above pin 26, washer 27 is mounted on said shaft and below said pin is mounted washer 28. A helical spring 29 is set about shaft 20 and compressed between washer 28 and rotor or armature 30, holding washer 27 up against bushing 21. Sleeve 31 is both loosely and slidably mounted on shaft 20. Link bracket 32 is fixed as a collar upon sleeve 31. The upper end of sleeve 31 projects into the bore of rotor 30, being babbitted for a tight fit in the latter by metal 81. Bracket 32 has its projecting end bifurcated, the upper end of link 33 being pivotally mounted therein by pin 34. The lower end of link 33 is pivotally connected to governor plate or weight 35 by means of pin 36. Governor plate 35, which straddles shaft 20, is pivotally mounted on the shaft by means of pivot pin 37. Because pin 37 is fixed to shaft 20, the linkage just described, namely governor plate 35, link 33, link bracket 32 and sleeve 31, rotate with said shaft. Since rotor 30 is fixed upon sleeve 31 it rotates with the latter and shaft 20.

The angular position of governor plate 34 about its pivot pin 37 is determined by the speed of rotation of the front wheel of bicycle 9 which through roller 12 effects the rotation of shaft 20, and of said plate about the axis of said shaft. When the bicycle exceeds a predetermined speed, plate 34 assumes the horizontal position shown for it in Fig. 2. At lower speeds, the left end of plate 35, Fig. 2, swings up, as spring 29 moves rotor 30 down on the shaft 20. See the McDermott patent noted above.

Laminated field frame 38 is set in recesses 39 formed in the top of the four ribs 40, the latter projecting above the top edge of casing 19. Shell 18 sets over ribs 40 and the top edge of casing 19, being received in an annular recess 41. Screws 42 extend through shell 18 into threaded holes formed in ribs 40 for fastening shell 18 to casing 19. Pole piece 43 has field coil 45 surrounding it, while pole piece 44 is surrounded by coil 46. As will be further explained hereafter, the current generated in field coil 45 by the rotation of rotor 30 will light front lamp 16, while the current generated in field coil 46 will light rear lamp 17. One rotor is used to generate two separate circuits. The multi-polar armature or rotor 30, is preferably made of "Alnico" and is permanently magnetized.

Figure 2:
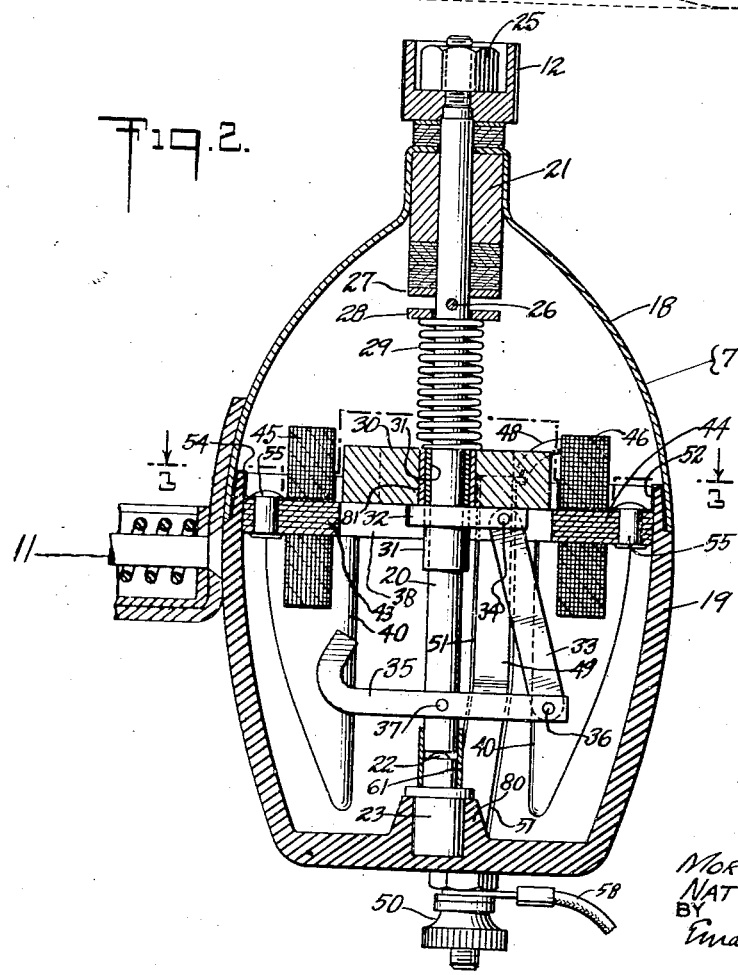
Fig. 2 is a vertical section of the generator.

As seen in Figs. 2, 4 and 5, terminal 48 of field coil 46 is connected by metal strip or lead 49 with binding post 50. Strip 49 is set in a channel formed by ribs 51 cast on casing 19. The other terminal of said coil is connected by metal strip 52 to shell 18, the latter being grounded to the bicycle frame by bracket 10 as seen in Figs. 1 and 6. In a similar manner one terminal of field coil 45 is connected by metal strip or lead 60 to binding post 53, Fig. 4. The other terminal of coil 45 is connected by metal strip or lead 54 to shell 18 which is grounded. Metal strips 52 and 54, besides grounding coils 45 and 46 act also to keep laminated field frame 28 in place down in recesses 39, said strips being held to the frame by rivets 55 and pinched at their outer end between shell 18 and casing 19. The inner end of strips 52 and 54 is turned up, keeping coils 46 and 45 from slipping off pole pieces 44 and 43 respectively. Rivets 55 also serve to keep together the laminations of field frame 38. Lead 60 is set between ribs 62.

As is well known, the rotation of permanently magnetized rotor 30 inside of field frame 38 and next to coils 45 and 46 produces currents in them. The strength of these currents is kept down when the bicycle goes fast by the action of governor plate 35 which causes rotor 30 to be lifted up out of field frame 38. At slower speeds rotor 30 returns into field frame 38. By this regulation, the current is kept from getting high enough to burn out lamps 16 and 17.

Field coil 45, Fig. 6, has one terminal connected to one terminal of front lamp 16 through wire 56. The other terminal of lamp 16 is connected to the ground or bicycle 9 through wire 57. The other terminal of coil 45 is grounded through shell 18, metal strip 54 connecting the terminal to shell 8 which is grounded to bicycle 9 by bracket 10. Field coil 46 has one terminal connected to one terminal of rear lamp 17 through wire 58. The other terminal of lamp 17 is connected to ground 9 through wire 59. The other terminal of coil 46 is grounded through shell 18, metal strip 52 connecting the terminal to shell 8 which is grounded to bicycle 9 by bracket 10.

We claim:

1. A bicycle generator having a housing formed of an open ended metal shell and an open ended casing, the shell and casing being fastened end on at their open ends with the shell overlapping the outside of the casing, a laminated field frame mounted in the casing substantially at its open end, field coils mounted on the frame, a permanent magnet armature adapted to rotate by the coils, contacts insulatively mounted in the housing and projecting to the outside of it, one terminal of each coil being connected to one of the contacts, and metal strip contacts, each of the metal strip contacts being attached at one end to the other terminal of a coil and at its other end coming between the shell and the casing at their overlap, a rivet fastening each strip at an intermediate portion to the field frame, said rivets extending through the field frame for holding its laminations together.

2. A bicycle generator having a housing formed of an open ended metal shell and an open ended casing, the shell and casing being fastened end on at their open ends, a laminated field frame mounted in the casing, field coils mounted on the frame, a permanent magnet armature adapted to rotate by the coils, contacts connected to the terminals of each coil for placing each coil in a circuit outside of the generator, one of said contacts for each coil being in the form of a metal strip extending from a terminal into engagement at its outer end with said shell, the inner end of said strip extending through the coil and then substantially radially opposite the inner face of the coil for retaining the coil on the field frame and a rivet fastening each strip to the field frame, each rivet being located between a coil and the housing, said rivets extending through the field frame for fastening its laminations together.

3. A bicycle generator having a housing formed of an open ended shell member and an open ended casing member, at least one of said members being of metal, said members telescoping and being fastened to each other at their open ends, ribs on the interior of the casing member, a field frame mounted in the casing member at its open end on the ends of the ribs near there, coils mounted on the frame, a permanent magnet armature adapted to rotate by the coils, contacts connected to the terminals of each coil for placing the coil in circuit outside of the generator, one of said contacts for each coil being in the form of a metal strip extending from a terminal to the telescoping ends of the members and being held by the latter, the inner portion of said strip extending through the coil and lying against the field frame on its side away from the ribs, the inner end of said portion extending substantially radially opposite the inner face of the coil for retaining the coil on the field frame, said contacts also holding the field frame in position on the ends of the ribs.

MORRIS KATCHER.
NAT C. GREENE.

REFERENCES CITED

The following references are of record in the file of this patent:

UNITED STATES PATENTS

| Number | Name | Date |
|---|---|---|
| 1,300,859 | Nikonow | Apr. 15, 1919 |
| 1,489,182 | Weinberg | Apr. 1, 1924 |
| 1,776,013 | Spengler | Sept. 16, 1930 |
| 2,299,762 | McDermott | Oct. 27, 1942 |

FOREIGN PATENTS

| Number | Country | Date |
|---|---|---|
| 547,270 | French | Sept. 16, 1922 |
| 783,594 | French | Apr. 8, 1935 |